United States Patent
Bechstein et al.

(10) Patent No.: US 6,615,652 B1
(45) Date of Patent: Sep. 9, 2003

(54) METHOD AND DEVICE FOR PRECISELY POSITIONING A VEHICLE IN A WIND TUNNEL

(75) Inventors: Hans-Dieter Bechstein, Steinheim (DE); Ernst Gassmann, Altbach (DE); Jürgen Pfisterer, Korb (DE); Berthod Schwartekopp, Weinstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/673,179

(22) PCT Filed: Mar. 17, 1999

(86) PCT No.: PCT/EP99/01741

§ 371 (c)(1), (2), (4) Date: Nov. 16, 2000

(87) PCT Pub. No.: WO99/51958

PCT Pub. Date: Oct. 14, 1999

(30) Foreign Application Priority Data

Apr. 6, 1998 (DE) ......................................... 198 15 321

(51) Int. Cl.⁷ ............................................... G01M 9/00
(52) U.S. Cl. ....................................................... 73/147
(58) Field of Search ............................................ 73/147

(56) References Cited

U.S. PATENT DOCUMENTS

| | | | | |
|---|---|---|---|---|
| 4,073,188 A | * | 2/1978 | Slezingeer et al. | 73/147 |
| 4,843,873 A | * | 7/1989 | Harald et al. | 73/147 |
| 5,025,659 A | * | 6/1991 | Starr, Jr. et al. | 73/147 |
| 5,495,754 A | * | 3/1996 | Star, Jr. et al. | 73/147 |
| 5,501,101 A | * | 3/1996 | Purcell | 73/147 |
| 5,866,813 A | * | 2/1999 | Nakaya et al. | 73/147 |
| 6,058,769 A | * | 5/2000 | Corriveau et al. | 73/147 |
| 6,155,111 A | * | 12/2000 | Wickern et al. | 73/147 |

FOREIGN PATENT DOCUMENTS

FR     2641378     7/1990

* cited by examiner

*Primary Examiner*—Hezron Williams
*Assistant Examiner*—Andre Allen
(74) *Attorney, Agent, or Firm*—Crowell & Moring LLP (57) ABSTRACT

A method for the accurate positioning of a vehicle to be examined aerodynamically in a measurement position in a wind tunnel, in which it assumes an accurately predefined relative position in relation to the axis of the wind tunnel, the measurement object is supported in the measurement position, in a stable position on the floor or on balance standing points in the wind tunnel, by auxiliary supports, in the case of a motor vehicle via its wheels. Outside the wind tunnel, the measurement object is placed onto a measurement-object carrier that can be moved at least in the longitudinal direction of the measurement-object carrier and is aligned accurately with respect to the latter. The measurement-object carrier with the aligned measurement object is moved into the wind tunnel and stopped in the latter in an accurately predefined position. The measurement object is subsequently transferred to the measurement section of the wind tunnel only in the vertical direction and is locked, the measurement-object carrier being brought into a waiting position that does not either influence and/or interfere with the measurement.

31 Claims, 4 Drawing Sheets

METHOD AND DEVICE FOR PRECISELY POSITIONING A VEHICLE IN A WIND TUNNEL

BACKGROUND OF THE INVENTION

The invention relates to a method for the accurate positioning of a measurement object to be examined aerodynamically, especially a vehicle. Furthermore, it relates to an apparatus for implementing this method.

FR 2 641 378 A1 shows the measurement section of a wind tunnel for the aerodynamic investigation of aircraft on a model scale. To be specific, aerodynamic investigations are to be carried out not only in the horizontal position of the aircraft model in relation to the air flow, but the flow relationships are also to be tested in rising or falling flight. For this purpose, there is arranged in the measurement section of the wind tunnel a device for holding the aircraft model, with which it can be held in a stationary position in the measurement section at different angles of attack. Provided in the device is a carrier which is bent in a semicircle and extends vertically through the measurement section in the area downstream of the measurement object, its centre of curvature being arranged in approximately the same position as the spatial centre of the measurement section. The carrier is configured so as to have beneficial flow properties in the air flow direction. At the centre of the carrier, an arm projects down in the, direction of the circle centre of the carrier and, at its free end, crries the aircraft model with carrying surfaces that are arranged at the same height on both sides, the arm being rigidly, connected to the tail of the vehicle model and being aligned with the aircraft fuselage. The upper and the lower end of the semicircular carrier is in each case connected by a join to horizontal guides that are aligned in the air flow direction and are arranged above and below the measurement section. In specific terms, the upper end of the carrier is pivotably articulated directly to a guide carriage; whereas the lower end of the carrier is coupled to two carriages guided in parallel, with the interposition of a Y-shaped rocker. In order to set different angles of attack, the upper carriage and the lower carriages of the semicircular carrier can be displaced simultaneously in the opposite direction over presettable displacement travels, so that although the carrier and the aircraft model fastened to it change their angular position in space, the position of the model in the measurement section remains virtually unchanged in the air flow direction. The movable mounting of the aircraft model in the known wind tunnel has, in terms of function, a certain correspondence with a turntable, such as is usually provided in the floor of the measurement section of vehicle wind tunnels. By means of such a turntable, the intention is for the vehicle positioned in the measurement section to be capable of being pivoted with its longitudinal axis into different angular positions in relation to the flow directions, in order in this way to be able to investigate lateral wind influences.

A wind tunnel is an installation which is not only complicated technically but also very expensive in, operation. On the other hand, however, wind-tunnel measurements are imperative, especially in the motor vehicle industry. The measurement object must be aligned in this case quite accurately in the wind tunnel and must assume an exactly predefined position. Until the latter is ensured, a relatively long time elapses, in which, basically, costs occur without any measurements being carried out.

Neither the turntable which is known from vehicle wind tunnels and provided in the floor of the measurement section, nor the device disclosed by FR 2 641 378 A1 for holding an aircraft model in different spatial positions, provides any points of approach to solving the problem of spatially exact pre-positioning of the vehicle on the turntable or of an aircraft model on the carrying arm. In any case, neither the turntable nor the disclosed holder of the aircraft model can be used for such exact positioning operations of the measurement object in the measurement section. Only after the measurement object has been pre-positioned in an exact relative position on the turntable of a vehicle wind tunnel, or has been fixed to the carrying arm of the aircraft wind tunnel, can the desired test position of the measurement object in the measurement section be moved to by means of the turntable and/or the manipulation equipment. It is only subsequently possible for the desired test position of the measurement object to be adjusted with the accuracy with which the measurement object was previously aligned and fastened on the turntable and/or on the manipulation equipment. However, for successful development activity, it is very important that the test conditions are known reliably and are predefined with high accuracy.

Consequently, there is the object of the present invention to provide a method of accurately positioning a measurement object to be examined aerodynamically in such a way that it permits a reduction in the wind-tunnel costs. Furthermore, the object of the invention is to provide an apparatus for implementing this method.

SUMMARY OF THE INVENTION

The method features of this claim is that accurate alignment of the measurement object is performed outside the wind tunnel and this measurement object is subsequently taken into the interior of the wind tunnel, in particular at the location predefined for the measurement, in such a way that the measurement position is assumed without further correction and is also maintained for the entire duration of the measurement. The costs for this measurement can therefore be reduced quite decisively, since the wind tunnel is truly only used when the envisaged measurements are also being carried out in it.

The critical factor in this method is therefore not only the correct alignment of the measurement object at any desired location outside the wind tunnel, but also its transfer whilst maintaining the adjustment previously carried out. The core of this invention is the use of a measurement-object carrier, on which the measurement object can not only be held such that it cannot be moved but can also be aligned exactly. Furthermore, this measurement-object carrier must be designed in such a way that, following its transport into the wind tunnel, the measurement object assumes the exact position which is correct for the measurement in the said tunnel, and the measurement is not influenced or even disrupted by the said measurement-object carrier. Furthermore, it must be capable of taking the measurement object out of the wind tunnel again following the measurement.

The result of this is that, in relation to the wind-tunnel costs, it is unimportant how long the alignment of the measurement object with respect to the measurement-object carrier lasts, since the associated operations can be carried out while, for example, another measurement object is being subjected to measurements in the wind tunnel. The alignment of the measurement object on the measurement-object carrier can be carried out in a similar way to the previous alignment in the wind tunnel, that is to say in this case a characteristic reference line on the measurement object is used, this line having a specific relative position in relation to the axis of the wind tunnel in the measurement section during measurement. In the method according to the invention, this reference line is registered in the X, Y and Z direction outside the wind tunnel. During the transfer from the preparation position outside the wind tunnel into the measurement position in the wind tunnel, the set position of the vehicle is maintained in all three axial directions.

Cones and mating cones are a means which are technically most suitable to bring two objects into a three-dimensionally correct mutual position. The present invention also provides the preconditions for a trouble-free transfer of the measurement-object carrier to the wind tunnel and its measurement section on the floor. To drive in the transport direction to a correct stopping point in the wind tunnel is a technical problem neither during transport by hand nor during automatic transport. After stopping at the accurate point, the only action which follows is lowering in order that the cones can enter the locally fixed mating cones, and then at the same time the correct alignment of the measurement object, especially the motor vehicle, in the-wind tunnel is therefore achieved.

As already mentioned, the measurement-object carrier must not impair or falsify the measurements and really should not interfere. To this extent, a configuration according to the present invention is particularly advantageous.

The measurement-object carrier is set down on a turntable (known per se) in the area of the measurement position of the wind tunnel. This turntable, with its reference line, which is located in the wind-tunnel axis during measurement, is rotated into the direction of travel of the measurement-object carrier as the measurement-object carrier is moved into the measurement position or removed from the same. And after the measurement object has been set down on the turntable, both are pivoted, together with the reference line or the longitudinal mid-axis, into the longitudinal axis of the wind tunnel. The measurement-object carrier then only needs to be moved radially towards the centre of rotation of the turntable or away from it. This has the advantage that curved paths when the measurement-object carrier is being moved in or out can be avoided.

If the measurement object is a motor vehicle, which stands on the tires both normally and during the measurements, then it is possible not to set it down on. the standing surfaces of the tires on the measurement-object carrier, if it is to be transferred quickly, reliably and accurately to the measurement section in the wind tunnel.

BRIEF DESCRIPTION OF THE DRAWINGS

Further advantageous configurations and modes of action emerge from the specification below.

The drawing illustrates exemplary embodiments of the apparatus according to the invention in a somewhat schematic manner. Here.

DETAILED DESCRIPTION OF THE PREFERRED EMBODIMENTS

Figure 1:
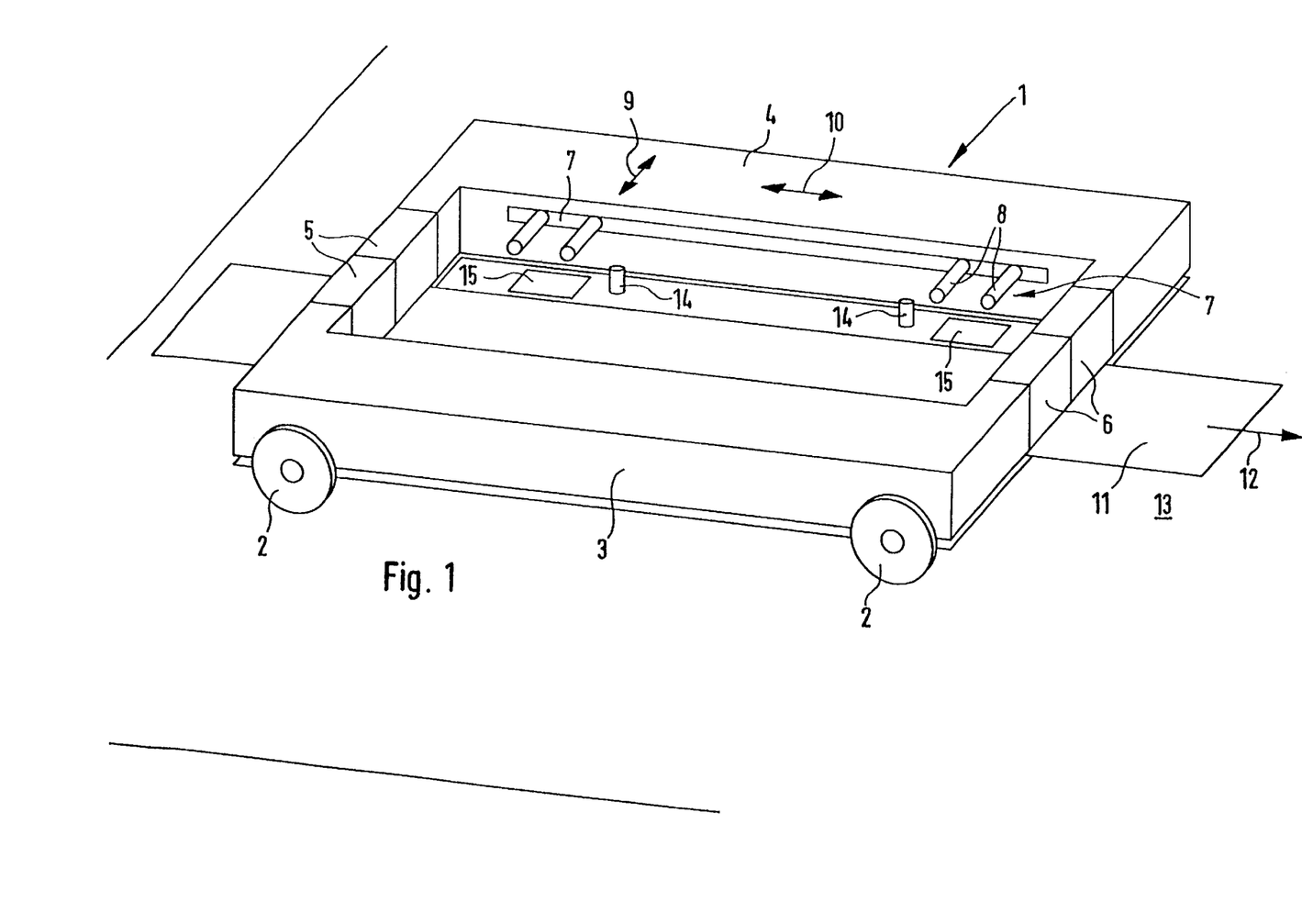
FIG. 1 shows a first measurement-object carrier in a perspective illustration in a position suitable for the transfer of the measurement object (not illustrated) to the measurement section.

The measurement-object carrier 1 of the first exemplary embodiment of the apparatus according to the invention for implementing the method according to the invention is equipped with four running wheels 2 which can either be folded out or moved out, that is to say in any case can be moved from an effective position (FIG. 1) into an ineffective position. In this exemplary embodiment, the said carrier essentially comprises the two approximately U-shaped longitudinal parts 3 and 4, which can be detachably connected to each other via coupling elements 5, 6 or else in each case by a pair of coupling elements, so that, together with the running wheels 2, overall an apparatus like a transport carriage is produced. The measurement object (not illustrated), especially a motor vehicle, is placed on two carrying elements 7, of which only in each case those of the longitudinal part 4 can be seen in the drawing. In this case, each carrying element in the exemplary embodiment comprises a pair of rods 8, which can be retracted and moved out in their longitudinal direction in the direction of the double arrow 9 and of which at least one pair can be moved with respect to the other ;in the direction of the double arrow 10. If, for example, the wheels of a motor vehicle are to be supported on these carrying elements, then in this way the axial spacing of the various motor vehicles serving as measurement objects can be taken into account. Incidentally, it is further pointed out that the coupling of the two longitudinal parts 3 and 4 can be dispensed with if the measurement object is only to be raised, since the moments continue to be absorbed by the lifting device permanently incorporated into the measurement section of the wind tunnel (not specifically illustrated). In addition, it is further pointed out at this point that the wind tunnel can have a conventional measurement section floor or can be equipped with conveyor-belt technology, which is recently common. In the drawing, a conveyor belt 11 is illustrated symbolically. Its longitudinal axis extends in the direction of the longitudinal axis of the wind tunnel or in the exemplary transport direction 12 of the measurement-object carrier 1.

Figure 2:
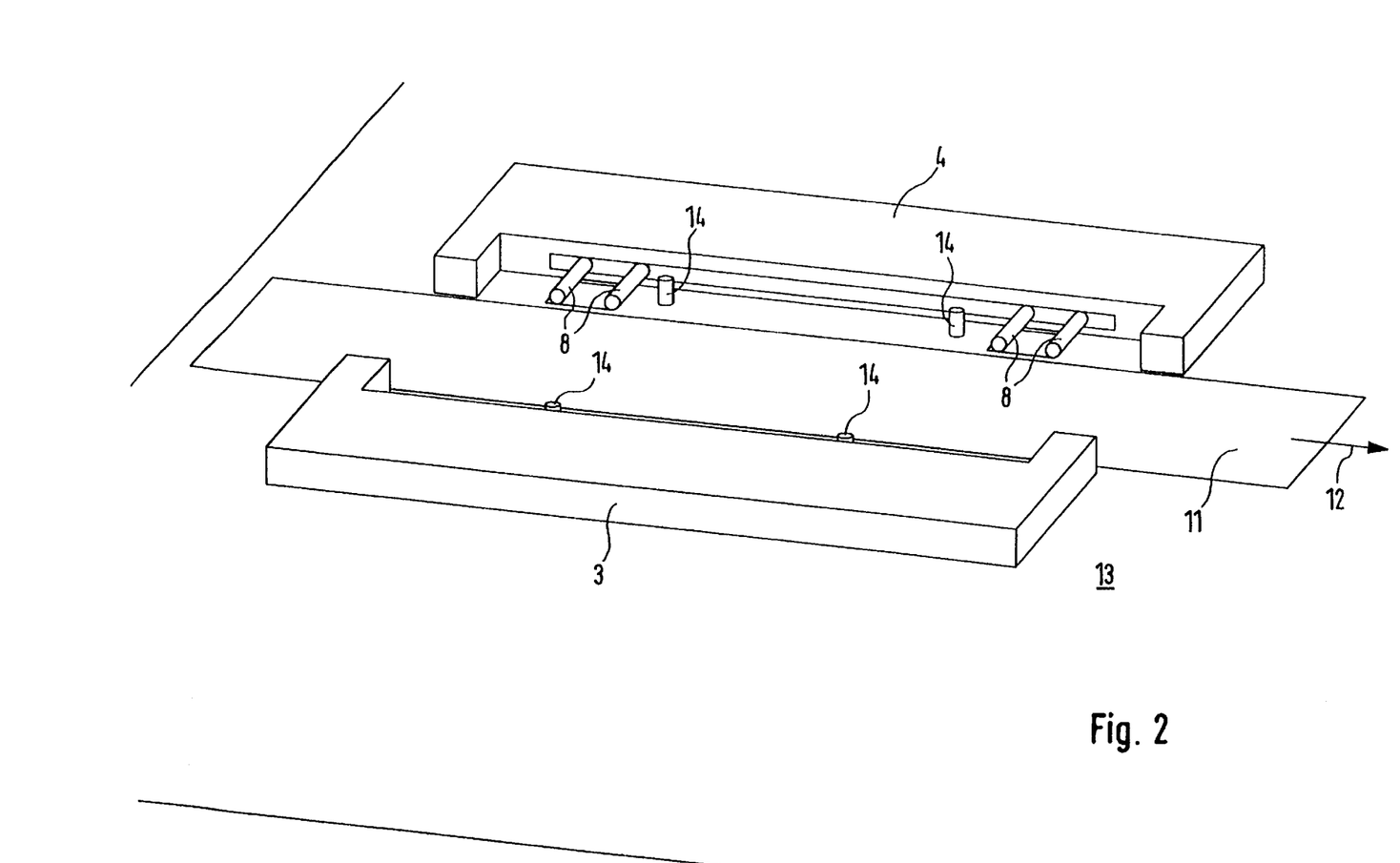
FIG. 2 shows an analogous illustration following a partial lowering of the measurement-object carrier.
Figure 3:
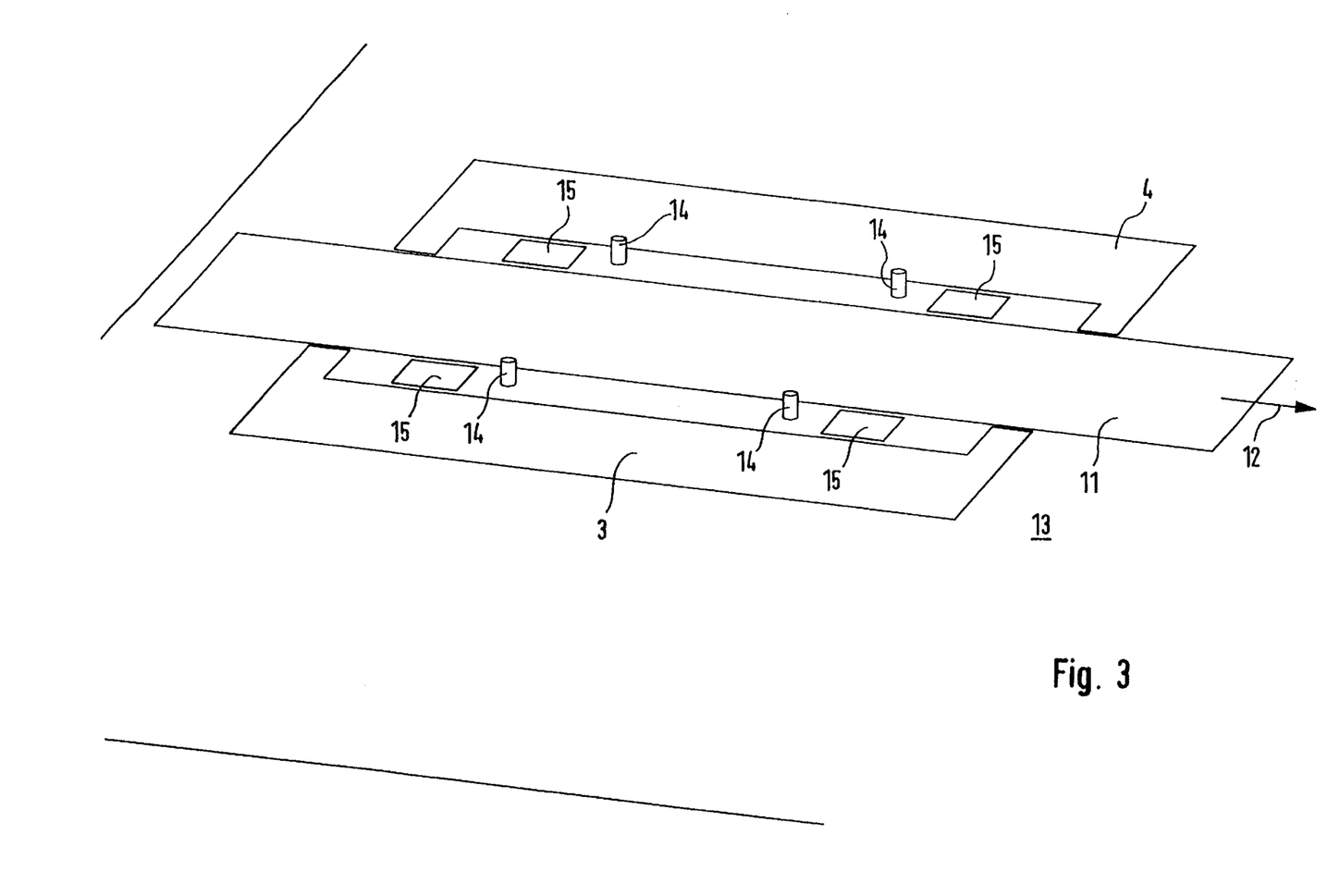
FIG. 3 shows a corresponding illustration after the measurement-object carrier has been lowered completely into the floor of the wind tunnel.

On the underside of the measurement-object carrier 1 there are at least two, but preferably four, positioning elements (not shown) in the form of a cone in each case. Fitted to the floor 13, especially countersunk, or at elements of the wind tunnel that are fixed there, are four mating cones in a corresponding arrangement. If, the measurement-object carrier with the measurement object or motor vehicle (not shown) is lowered, so that via the intermediate position according to FIG. 2, the end position according to FIG. 3 is finally reached, then the cones engage in the mating cones fixed to the wind tunnel. As a result, the exact position of the measurement-object carrier in the wind tunnel is achieved, specifically in all three coordinate directions. At the same time, the motor vehicle is then quite accurately aligned with respect to the wind tunnel or a reference line as well. In this case, however, it should further be noted that, in the case of motor-vehicle wheels, when the latter are supported on the rods of each carrying element, they project downwards beyond the rods.

In the area of the measurement section of the wind tunnel, in the area of its floor, there are a number of supporting elements 14, especially four in the exemplary embodiment, which mark the corners of a rectangle. They can be divided in a manner not specifically shown. In addition, each supporting element is further assigned a wheel-turning element 15. With regard to the supporting elements and the wheel-turning elements 15, they can be, at least in principle, known designs. In relation to the carrying elements 7, it should further be added that, when they are transferred from the withdrawn position into the position of use shown, they are moved out, towards one another. In order to align the measurement object transversely with respect to the measurement-object carrier 1, it is equally possible to move them all at the same time synchronously towards the left-hand longitudinal part or all towards the right-hand longitudinal part, as referred to the transport direction 12. As can easily be seen, this serves to align the measurement object transversely, while the longitudinal alignment of the said measurement object can be performed by appropriately, moving and positioning the individual carrying elements in the direction of the arrow 12 or in the opposite direction.

As has already been explained, the supporting elements 14 are preferably divisible and are constructed as sill supports. They are adjustable in the X and Y direction, that is to say in the longitudinal and transverse direction, so that they can be adjusted to different vehicles. They are adjustable in the Z direction, in order to be able to change the position of the bodywork of the measurement object in relation to the floor of the measurement section. They remain to some extent in the measurement section.

FIG. 3 reveals that, in the case of this variant, the measurement-object carrier 1 in the measurement position is a constituent part of the floor 13 of the wind tunnel (FIG. 3). Furthermore, it can be seen from FIG. 3 that during measurement the coupling elements 5 and 6 are retracted, and the two longitudinal parts 3 and 4 of the measurement-object carrier are located on this side and the other side of the conveyor belt 11 or, in the case of a design without a conveyor belt, on this side and the other side of a corresponding area on the floor of the wind tunnel. They are lowered flush with the surface, and this preferably also applies for all the parts which can be detached from the measurement-object carrier and which carry auxiliary supports of the measurement object.

An important aspect of this apparatus according to the invention also resides in the fact that it can be used as a lifting platform both in the measurement section and at the workplaces outside. The maximum lifting height depends on the locally fixed lifting system. In this way, it is possible to save a lifting platform at all the workplaces. As described, the alignment in the longitudinal direction of the vehicle is carried out quasi-automatically, while the alignment in the transverse direction of the vehicle is performed semi-automatically.

In the case of a divided embodiment of the supporting elements 14, the two parts are automatically uncoupled. In the drawing (FIG. 2), that part of the supporting elements which is fixed to the wind tunnel can be seen. The removable part is located on the measurement object, for example in each case on the sill of the motor vehicle, and is mounted on there outside the wind tunnel. When the vehicle located in its measurement position is lowered in the wind tunnel, the two parts of the supporting elements 14 are coupled automatically. Otherwise, it is possible for the aforementioned centring to be performed, as mentioned, via cones and mating cones in the area of the supporting elements 14. The wheel-turning elements are already known as such. They permit the vehicle wheels to be driven during the measurement, so that a situation close to operation can be simulated. The supporting elements 14 connected to the measurement object otherwise prevent the vehicle moving away, in spite of the wheels being driven.

In the second exemplary embodiment of the apparatus according to the invention (FIG. 4), the measurement-object carrier 1 comprises two transport units 16 and 17 arranged one behind another in the transport direction 12. They can be coupled to each other mechanically, which is symbolized by connecting elements 18 and 19 in FIG. 4. In the case of a mechanical connection, these connecting elements can either be shortened or can at least be retracted to some extent into at least one of the transport units. Instead of a mechanical connection, an electronic spacer can also be provided. In the latter case, both transport units must then be self-propelled, while in the case illustrated, with the mechanical coupling, it is sufficient for only one transport unit to be self-propelled. In any case, the transport units have at least four running wheels 20. In the exemplary embodiment, there are in each case four pairs of running wheels.

Figure 4:
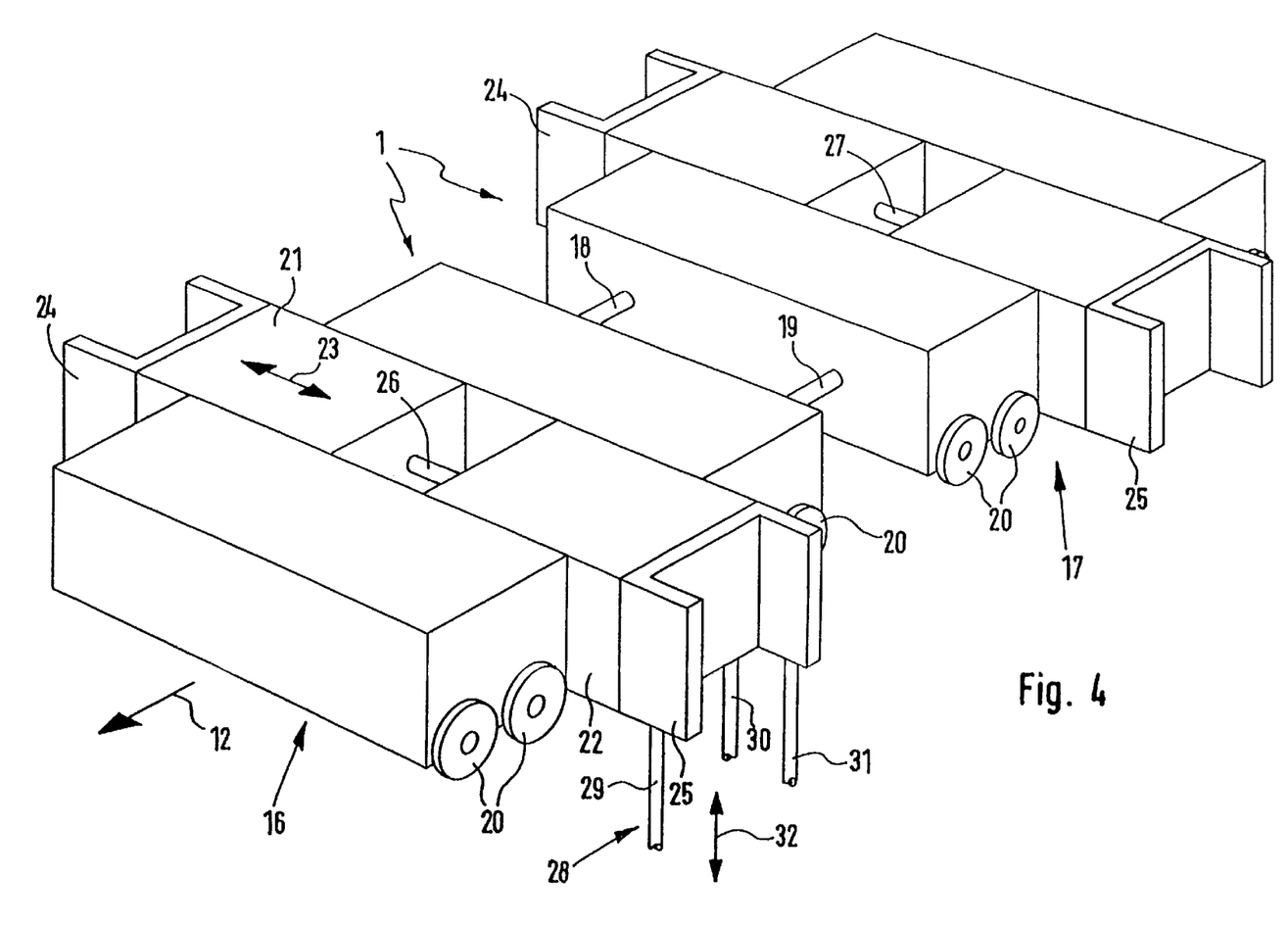
FIG. 4 shows, in a very schematic illustration, a second embodiment of the measurement-object carrier.

When there is an installed conveyor belt 11, the measurement-object carrier comprising the transport units 16 and 17 moves away over the conveyor belt. Since the conveyor belt has to be tensioned, and also retensioned continually, beside the tensioning rollers there are areas in which there are no load-bearing guide surfaces for the conveyor belt, but they are covered freely just by the conveyor belt. The four running wheels on each side of the measurement-object carrier, provided in the illustrated exemplary embodiment, are intended to ensure that the measurement-object carrier can travel over this gap without any risk to the relatively sensitive conveyor belt. If it is possible to bridge this gap in a manner which can bear a load, for example by means of meshing structures which engage telescopically in one another, it would then also be possible for fewer running wheels to be provided on each side of the object carrier.

Each transport unit accommodates two auxiliary supports of the measurement object or, in the case of a motor vehicle to be measured, two wheels of the latter. In the following text, only wheels or a motor vehicle to be measured will be mentioned, but this must not be understood to be restrictive.

Each transport unit 16, 17 has two carriages 21 and 22 which can be adjusted transversely or perpendicularly with respect to their transport direction 12. As shown in the drawing, they can be sufficiently large that they rest approximately on one another when they are retracted. Instead of this, it is also possible to provide a non-displaceable intermediate piece, and then to design the carriages to be correspondingly shorter in the direction of travel 23. Each carriage is used to support a wheel of the motor vehicle to be measured.

In order to be able to be adjust-the transport unit to the track width of the motor vehicle, the two carriages 21, 22 are moved towards each other or away from each other. Semi-automatic transverse alignment of the vehicle is not possible with the measurement-object carrier according to FIG. 4, since the U-shaped carrying elements 24, 25 rely on the position of the corresponding cut-outs in the floor of the wind tunnel when the vehicle is set down. The measurement object must therefore be aligned accurately centrally by hand in the transverse direction on the measurement-object carrier.

In the exemplary embodiment of FIG. 4, the carrying elements in each case have a U-shaped configuration with U legs that project to the left and right. The clearance between the latter forms a holder for a wheel, which is held securely when it is set down onto the two U legs. Instead of U-shaped carrying elements, it is also possible to provide frame-shaped elements which have an appropriate holder for the standing end of the wheel.

The two carriages 21 and 22 can be coupled mechanically to each other via adjustment spindles, which is symbolized by the connecting elements 26 and 27 drawn schematically in FIG. 4. Of course, individual adjustment with known adjusting devices and position detection means is also possible. The adjustment is preferably carried out via the connecting elements 18 and 19 and by means of the connecting elements 26 and 27, expediently under remote control. The same is true in the case of individual adjustment. The design of the servo drives, the remote controllers and any possible guides are not concerned in detail here. For this reason, to this extent details are neither shown nor described, instead they can be of a conventional design and mode of action. Instead of an individual spindle or a pair of spindles, it is of course also possible for a spindle triplet to be provided.

The carrying elements 24, 25 are removably fitted to the carriage 21 and 22, respectively. As will be explained in more detail below, this has the advantage that they can be left in the wind tunnel during the measurement and only the measurement-object carrier which has been freed of the carrying elements can be moved out of the measurement area, but preferably out of the wind tunnel itself during the measurement.

Each carrying element 24, 25 is detachably connected to the associated carriage 21 or, 22 by means of a remotely operated locking device. In this case, provision is in particular made for corresponding, locking elements to be provided on the carriages 21, 22, the said elements being capable of being locked into and out of locking receptacles which are correspondingly shaped and designed and arranged on the carrying elements 24, 25. The locking elements can preferably be countersunk in the carriage.

In the measurement position of the measurement-object carrier, as has already been mentioned, the carrying elements 24 and 25 can be accepted by a lifting device 28 belonging to the wind tunnel, or can be transferred to the said lifting device. This may be a known design, which comprises three lifting spindles. 29, 30, 31. They are fitted to the floor of the wind tunnel in the measurement area, at the measurement section, and can be extended and retracted in a known way. If the measurement section is preferably located on a turntable, which is not illustrated but is known per se, then the lifting devices 28 are also fitted to this turntable. As is known, a turntable has the advantage that it is also possible to bring the objects or vehicles to be measured into the measurement area or at the measurement location obliquely to the wind direction, and then align them accordingly by means of the turntable. It is preferable, in the case of the wind-tunnel installation that can be used here, for it to be possible for the vehicles to be transported in and out in four different transport paths or sections which are each offset by 90° with respect to each other and offset by 45° with respect to the wind-tunnel axis. In this way, the wind tunnel can be equipped with various preparation rooms, workshops and the like, which as a whole permit the vehicle to be taken. directly into the measurement area. In no case is it necessary for the measurement-object carrier to carry out a movement other than a straight-line movement in the wind tunnel.

The lifting spindles 29, 30, 31 are brought up from below in the direction of the arrow 32 as soon as the measurement-object carrier has reached its position suitable for the measurement in the wind tunnel. In the case of U-shaped carrying, elements 24, 25, they are in each case brought up against one of the three U legs, and can therefore also preferably be remotely controlled and locked. After the uncoupling of the carriages 21, 22 and the removal of the measurement-object carrier freed from the carriages in the direction of the arrow 12 or in the opposite direction, the carrying elements 24, 25 are lowered at the same time, which can again be done under remote control. The lowering is completed when the vehicle wheels are either standing on the floor or—as envisaged in the exemplary embodiment according to FIGS. 1 to 3—are standing on corresponding wheel-turning elements 15.

In the case of wheel-turning elements 15 which are each formed by small conveyor belts, during the measurement, the conveyor belt or each conveyor belt is enclosed by the associated carrying element 24, 25 in the area of the wheel standing surface.

The two parts of the transport units 16, 17 which are placed on this side and the other side of the carriages 21, 22 can also further accommodate batteries and similar accessories for operation and/or movement, in addition to the abovementioned units and controllers.

While the above description constitutes the preferred embodiment of the invention, it will be appreciated that the invention is susceptible to modification, variation, and change without departing from the proper scope or fair meaning of the accompanying claims.

What is claimed is:

1. A method for the accurate positioning of a measurement object to be examined aerodynamically, in a measurement position in a wind tunnel, in which the object assumes an accurately predefined relative position in relation to the axis of the wind tunnel, the measurement object being supported in the measurement position in a stable position on a floor of the wind tunnel by auxiliary supports, comprising:

outside the wind tunnel, placing the measurement object onto a measurement-object carrier that is adapted to be movable at least in a longitudinal direction of the wind tunnel, the measurement object thereby being aligned accurately with respect to the carrier, and moving the measurement-object carrier with the aligned measurement object into the wind tunnel, and stopping the measurement-object carrier in the wind tunnel in an accurately redefined position, transferring the measurement object subsequently to a measurement section of the wind tunnel only in the vertical direction and thereby or subsequently locking the measurement object, the measurement-object carrier being brought into a waiting position that neither influences nor interferes with the measurement, after the measurement, accepting the measurement object by the measurement-object carrier again or transferring the measurement object to the measurement-object carrier, and finally, taking out the measurement-object carrier with the measurement object of the wind tunnel.

2. The method according to claim 1, wherein the loaded measurement-object carrier is moved into and out of the wind tunnel by way of running wheels.

3. The method according to claim 1, wherein the measurement object on the measurement-object carrier is aligned three-dimensionally, or transversely with respect to the longitudinal axis of the wind tunnel, with respect to the measurement-object carrier.

4. The method according to claim 1, wherein the measurement-object carrier is lowered into the floor of the wind tunnel, the measurement object, when carrying elements of the measurement-object carrier are lowered, being transferred to stationary supporting elements, supporting-element parts or wheel-turning elements in an area of the measurement section, at the measurement position.

5. The method according to claim 1, wherein, after the transfer of the measurement object to lifting devices belonging to the wind tunnel, the measurement-object carrier is taken at least out of the measurement area of the wind tunnel, the lifting devices being used to lower the measurement object in an area of the measurement section, at the measurement position, onto the floor of the wind tunnel, onto wheel-turning elements on the floor.

6. The method according to claim 1, wherein, during the measurement of a measurement object inside the wind tunnel, at least one further measurement object is aligned with respect to a further measurement-object carrier, outside the wind tunnel, and is prepared for measurement, standing surfaces of the auxiliary supports of the measurement object being kept free.

7. The method according to claim 1,
wherein the measurement-object carrier is set down on a turntable in an area of the measurement position, the turntable with a reference line, which is located in the wind tunnel axis during measurement, being rotated into a direction of travel of the measurement-object carrier as the measurement-object carrier is moved into the measurement position or removed from the measurement position, and the measurement-object carrier being moved radially towards the center of rotation of the turntable or moved away from the center of rotation, and
wherein, after the measurement object has been set down on the turntable, both are pivoted, together with the reference line or longitudinal mid-axis, into the longitudinal axis of the wind tunnel.

8. An apparatus for preparing an aerodynamic measurement on a floor-supported measurement object in a wind tunnel, which has a measurement section having a floor that accommodates the measurement object in a predefined position during the aerodynamic measurement, comprising:
a measurement-object carrier that is displaceable or movable relative to the measurement section of the wind tunnel to accommodate the measurement object in an accurate position,
positioning elements that act in the longitudinal and transverse directions, together with locally fixed mating positioning elements in an area of the measurement section of the wind tunnel, ensuring an accurate, reproducible measurement position in the wind tunnel, and
a lifting device by way of which the measurement-object carrier, or at least detachable parts thereof, are capable of being lowered into the floor of the measurement section and raised out of said floor in the transfer position at the measurement section.

9. The apparatus according to claim 8, wherein the measurement-object carrier is equipped with four carrying elements, which mark corners of a rectangle, for auxiliary supports of the measurement object.

10. The apparatus according to claim 9, wherein the carrying elements are displaceable and lockable in an approximately horizontal direction transversely with respect to a transport direction of the measurement-object carrier.

11. The apparatus according to claim 9, wherein each of the carrying elements comprises a pair of rod elements, with selected mutual spacing which is adjustable such that a standing surface of the respective auxiliary support of the measurement object resting thereon projects downwards beyond the carrying elements.

12. The apparatus according to claim 1, wherein, as viewed in the transport direction, spacing between two of the carrying elements are adjustable.

13. The apparatus according to claim 8, wherein the supporting elements are constructed as sill supports which are dividable.

14. The apparatus according to claim 8, wherein the transport system with the measurement-object carrier in the measurement position is a constituent part of the floor of the wind tunnel.

15. The apparatus according to claim 8, wherein, as viewed in the transport direction, the measurement-object carrier has a left-hand and a right-hand longitudinal part and, during measurement, said parts are located on the left and right of a conveyor belt or a subarea of the wind-tunnel floor at the measurement location in the wind tunnel.

16. The apparatus according to claim 15,
wherein the two longitudinal parts are coupleable, at least in a maximum raised position of the-measurement-object carrier, and
wherein, at the same time, running wheels of the measurement-object carrier can be brought into a working position.

17. The apparatus according to claim 8, wherein the measurement-object carrier comprises two transport units which are arranged one behind another in the transport direction, which each accommodate auxiliary supports of the measurement object, and which, at least during empty transport, are configured to be coupleable mechanically or by an electronic spacer.

18. The apparatus according to claim 17, wherein each of the transport units are movable by at least four running wheels or pairs of running wheels.

19. The apparatus according to claim 17, wherein each of the transport units has two carriages which are adjustable transversely, with respect to corresponding transport directions, to support one wheel each of the measurement object.

20. The apparatus according to claim 19, wherein the carriages are mounted on the respective transport unit such that the carriages are adjustable or displaceable towards each other or simultaneously in the same direction.

21. The apparatus according to claim 20, wherein the carriages are adjustable by a servomotor under remote control.

22. The apparatus according to claim 17, wherein the transport units are coupled to each other such that the transport units are adjustable by a pair or triplet of spindles.

23. The apparatus according to claim 17, wherein, at an outer end, each of the carriages carries an approximately U-shaped or frame-shaped carrying element to accommodate a vehicle wheel, said element being removably held and, in the measurement position, capable of being coupled to a lifting device that remains in the wind tunnel, or capable of at least being accepted by said lifting device.

24. The apparatus according to claim 23, wherein each of the carrying elements is configured to be detachable from the corresponding carriage by way of a remotely operated locking device.

25. The apparatus according to claim 24, wherein locking elements of the locking device are configured to be countersunk in the carriage and, in a working position, engage and lock in recessed receptacles on the carrying element.

26. The apparatus according to claim 23, wherein the lifting device has at least two lifting spindles, which are configured to be brought up from below against the corresponding carrying element and are configured to be brought into contact with or coupleable to the corresponding carrying element.

27. The apparatus according to claim 23, wherein, in an area of each of the carrying elements that is located in the measurement position, a conveyor belt or a conveyor-belt area is arranged.

28. The apparatus according to claim 27, wherein, during measurement, the conveyor belt is enclosed by the carrying element in an area of a wheel standing surface.

29. The method according to claim 2, wherein the running wheels are in a track-guided manner.

30. The apparatus according to claim 17, wherein both of the transport units are self-driven.

31. The apparatus according to claim 17, wherein both of the transport units are capable of being self-propelled by running wheels.

* * * * *